(12) United States Patent
Zhu

(10) Patent No.: US 11,417,341 B2
(45) Date of Patent: Aug. 16, 2022

(54) METHOD AND SYSTEM FOR PROCESSING COMMENT INFORMATION

(71) Applicant: Shanghai Bilibili Technology Co., Ltd., Shanghai (CN)

(72) Inventor: Yue Zhu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 295 days.

(21) Appl. No.: 16/801,073

(22) Filed: Feb. 25, 2020

(65) Prior Publication Data

US 2020/0312327 A1  Oct. 1, 2020

(30) Foreign Application Priority Data

Mar. 29, 2019  (CN) .......................... 201910248728.9

(51) Int. Cl.
*G10L 15/26* (2006.01)
*G10L 21/0208* (2013.01)
(Continued)

(52) U.S. Cl.
CPC .......... *G10L 15/26* (2013.01); *G10L 21/0208* (2013.01); *H04L 51/52* (2022.05);
(Continued)

(58) Field of Classification Search
CPC .... G06F 16/7844; G06F 21/602; G06F 40/30; G06F 3/165; G06F 16/41; G06F 16/745; G06F 21/604; G06K 9/6267; G06V 20/40; G06V 20/41; G06V 40/103; G06V 10/993; G07C 5/0841; G10L 15/22; G10L 15/26;
(Continued)

(56) References Cited

U.S. PATENT DOCUMENTS 5,228,076 A * 7/1993 Hopner .............. H04Q 11/0407
704/266
7,352,385 B2 * 4/2008 Kakii ..................... H04N 7/147
(Continued)

FOREIGN PATENT DOCUMENTS

CN 105898557 A 8/2016
CN 106921868 A 7/2017

OTHER PUBLICATIONS

Shiori Ota; "There is a secret under Miss yingzi's feet II Bones, pomegranates and summer vacation"; BaiHuaZhou Literature and Art Publishing House; 2013; p. 165 (contains English Abstract).

(Continued)

*Primary Examiner* — Gerald Gauthier
(74) *Attorney, Agent, or Firm* — BakerHostetler

(57) ABSTRACT

Techniques for processing comment information are disclosed herein. The disclosed techniques include collecting first voice information from a user in response to receiving a request for inputting voice information while the user is watching a video comprising a plurality of segments; obtaining a timestamp corresponding to a segment among the plurality of segments of the video; processing the first voice information and obtaining second voice information; and generating bullet screen information based at least in part on the timestamp and the second voice information.

17 Claims, 11 Drawing Sheets

(51) Int. Cl.
*H04N 21/439* (2011.01)
*H04N 21/8547* (2011.01)
*H04L 51/52* (2022.01)

(52) U.S. Cl.
CPC ....... *H04N 21/439* (2013.01); *H04N 21/8547* (2013.01); *G10L 2021/02087* (2013.01)

(58) Field of Classification Search
CPC ....... G10L 21/0208; G10L 2021/02087; G11B 27/034; G16H 50/70; H04L 51/32; H04L 51/38; H04L 67/18; H04M 1/271; H04N 7/147; H04N 7/15; H04N 21/2668; H04N 21/4223; H04N 21/439; H04N 21/47217; H04N 21/4756; H04N 21/8106; H04N 21/8547; H04Q 11/0407; A61B 34/20; A63F 13/65; G06Q 50/01; G06T 7/246
USPC ......... 348/14.01, 14.07; 379/93.17; 386/234; 455/412.1; 704/235; 715/753
See application file for complete search history.

(56) References Cited

U.S. PATENT DOCUMENTS

| | | | | |
|---|---|---|---|---|
| 7,877,774 | B1* | 1/2011 | Basso | G06F 16/41 725/115 |
| 9,189,818 | B2* | 11/2015 | McClements, IV | G11B 27/034 |
| 10,067,772 | B1* | 9/2018 | Ledet | H04L 67/18 |
| 10,237,615 | B1* | 3/2019 | Gudmundsson | G06V 20/40 |
| 10,529,336 | B1* | 1/2020 | Matthews | H04M 1/271 |
| 10,747,894 | B1* | 8/2020 | Cline | G10L 15/22 |
| 10,917,681 | B2* | 2/2021 | Feng | G10L 15/26 |
| 10,970,414 | B1* | 4/2021 | Lesner | G06F 21/602 |
| 2001/0040942 | A1* | 11/2001 | Glowny | H04M 3/42221 |
| 2001/0043685 | A1* | 11/2001 | Bscheider | H04M 3/42221 |
| 2001/0055372 | A1* | 12/2001 | Glowny | G11B 31/00 |
| 2007/0127879 | A1* | 6/2007 | Frank | H04N 21/4223 348/E5.002 |
| 2007/0135096 | A1* | 6/2007 | Sampath | H04L 51/38 704/E15.045 |
| 2009/0249223 | A1* | 10/2009 | Barsook | H04N 7/15 715/753 |
| 2010/0157013 | A1* | 6/2010 | Sylvain | H04N 7/147 348/14.01 |
| 2013/0198642 | A1* | 8/2013 | Carney | H04N 21/47 715/738 |
| 2015/0012840 | A1* | 1/2015 | Maldari | H04N 21/4722 715/748 |
| 2015/0281756 | A1* | 10/2015 | Soon-Shiong | H04N 21/4223 725/14 |
| 2016/0286164 | A1* | 9/2016 | Kratz | G06T 7/246 |
| 2017/0127150 | A1* | 5/2017 | Kuo | H04N 21/234309 |
| 2017/0168660 | A1* | 6/2017 | Li | G10L 13/08 |
| 2017/0171614 | A1* | 6/2017 | el Kaliouby | G16H 50/70 |
| 2017/0311039 | A1* | 10/2017 | Zuo | H04N 21/2668 |
| 2018/0184045 | A1* | 6/2018 | Chiang | G10L 15/26 |
| 2019/0110856 | A1* | 4/2019 | Barral | A61B 34/20 |
| 2019/0156433 | A1* | 5/2019 | Lin | G06Q 50/01 |
| 2019/0156434 | A1* | 5/2019 | Lin | G06Q 50/01 |
| 2019/0158624 | A1* | 5/2019 | Lin | G06Q 50/01 |
| 2019/0166394 | A1* | 5/2019 | Lin | H04N 21/47217 |
| 2019/0179852 | A1* | 6/2019 | Fei | G06V 20/41 |
| 2019/0266408 | A1* | 8/2019 | Wang | G06V 40/103 |
| 2019/0341028 | A1* | 11/2019 | Loghmani | G06F 16/7844 |
| 2020/0007926 | A1* | 1/2020 | Tang | H04N 21/8106 |
| 2020/0012811 | A1* | 1/2020 | Walters | G06K 9/6267 |
| 2020/0059687 | A1* | 2/2020 | Zane | H04N 21/8106 |
| 2020/0076754 | A1* | 3/2020 | Kim | H04N 21/414 |
| 2020/0084485 | A1* | 3/2020 | Dunning | H04N 21/25825 |
| 2020/0099994 | A1* | 3/2020 | Latham | G06F 3/165 |
| 2020/0120363 | A1* | 4/2020 | De Decker | H04N 21/231 |
| 2020/0213665 | A1* | 7/2020 | Rege | H04N 21/4425 |
| 2020/0236438 | A1* | 7/2020 | Tagra | H04N 21/26233 |
| 2020/0312327 | A1* | 10/2020 | Zhu | H04N 21/4756 |
| 2020/0312348 | A1* | 10/2020 | Shao | G10L 15/16 |
| 2020/0387570 | A1* | 12/2020 | Biswas | G06F 40/30 |
| 2022/0013015 | A1* | 1/2022 | J | G07C 5/0841 |

OTHER PUBLICATIONS

The Compilation of Outstanding Scientific and Technological Achievements in "Tenth Five-year" National Safety Production; Planning and Technology Dept. of State Administration of Safety Production and Dept. of Social Development Science and Technology, Ministry of Science and Technology; Coal Industry Press; Jun. 2007; p. 124 (English Translation).

* cited by examiner

METHOD AND SYSTEM FOR PROCESSING COMMENT INFORMATION

CROSS-REFERENCE TO RELATED APPLICATION

The present application claims priority to Chinese Patent Application No. 201910248728.9 filed on Mar. 29, 2019, the entire disclosure of which is hereby incorporated by reference.

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

BRIEF DESCRIPTION OF THE DRAWINGS

The following detailed description may be better understood when read in conjunction with the appended drawings. For purposes of illustration, there are shown in the drawings exemplary embodiments of various aspects of the disclosure; however, the disclosure is not limited to the specific methods and instrumentalities disclosed.

DETAILED DESCRIPTION OF ILLUSTRATIVE EMBODIMENTS

Figure 1:
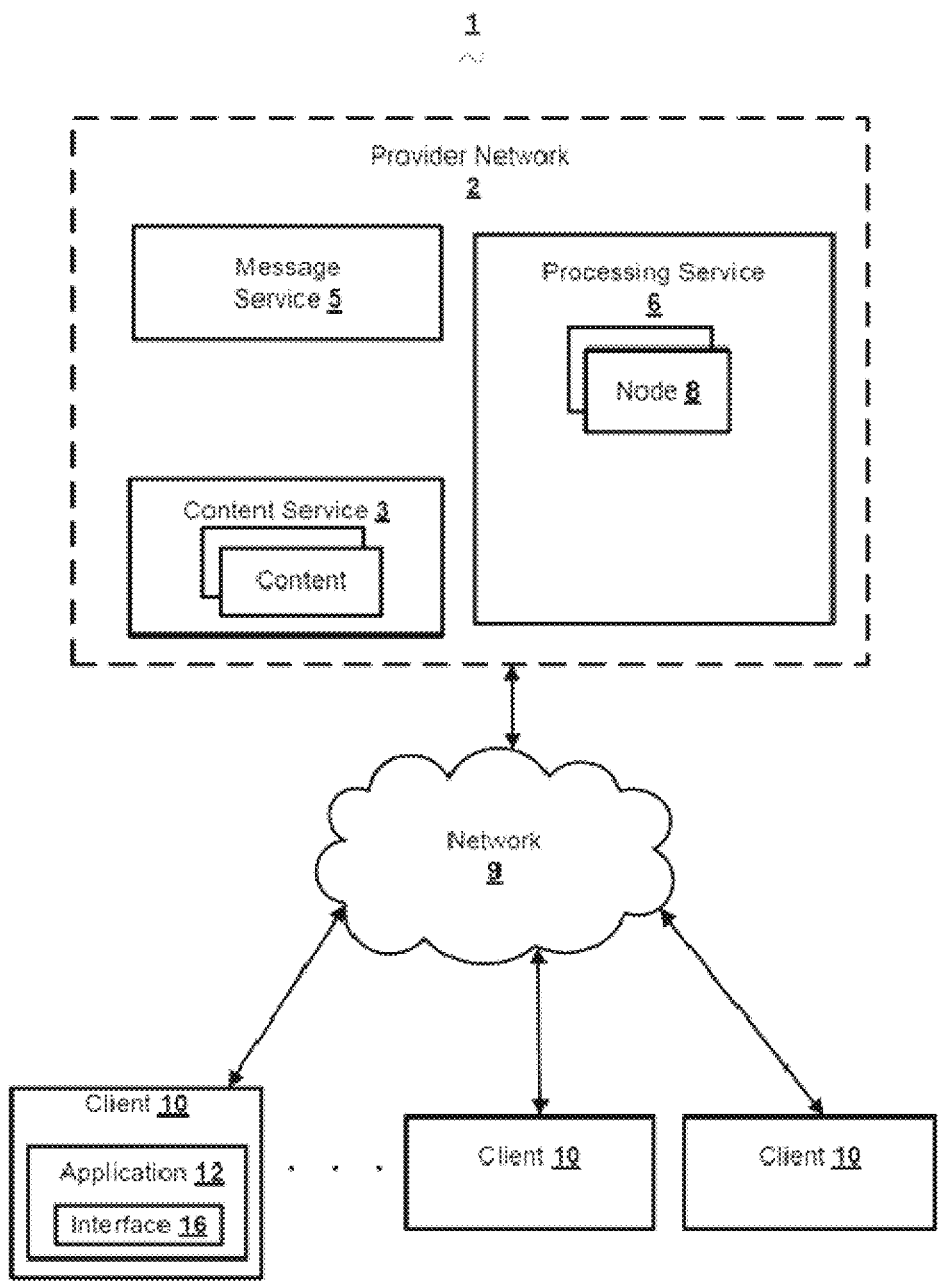
FIG. 1 is a schematic diagram illustrating an example system that may be used in accordance with the present disclosure.

FIG. 1 is a schematic diagram showing an example system 1 that may be used in accordance with the present disclosure. The system 1 may comprise a provider network 2 and a plurality of client devices 10. The provider network 2 and the plurality of client devices 10 may communicate with each other via one or more networks 9.

In some embodiments, the content service 3 may be implemented as part of the provider network 2. In other embodiments, the content service 3 may be managed by a separate service provider than a service provider of the provider network 2. It should also be understood that the provider network 2 may provide additional content services separate from the content service 5.

The content service 3 may comprise a content streaming service, such as an Internet protocol video streaming service. The content streaming service may be configured to distribute content via a variety of transmission techniques. The content service 3 may be configured to provide the content, such as video, audio, textual data, a combination thereof, and/or the like. The content may comprise content streams (e.g., video stream, audio stream, information stream), content files (e.g., video file, audio file, text file), and/or other data. The content may comprise gaming content. For example, the content service 5 may comprise a collaborative gaming platform, a video sharing service, a video hosting platform, a content distribution platform, and/or the like.

The provider network 2 may implement a commentary service configured to allow users to comment and/or share comments associated with content. The comments may be displayed with the content on the same screen. For example, the comments may be displayed in an overlay above the content. The comments may be encoded into a format of the content. For example, the comments may be encoded as video content as the original content. The comments may be animated when displayed. For example, the comments may be shown scrolling (e.g., from right to left, left to right, top to bottom, bottom to top) across the content, which may be referred to as "bullet screen."

The provider network 2 may be located at a data center, such as a single premises, or be distributed throughout different geographic locations (e.g., at several premises). The provider network 2 may provide the services via the one or more networks 9. The networks 9 comprise a variety of network devices, such as routers, switches, multiplexers, hubs, modems, bridges, repeaters, firewalls, proxy devices, and/or the like. The networks 9 may comprise physical links, such as coaxial cable links, twisted pair cable links, fiber optic links, a combination thereof, and/or the like. The networks 9 may comprise wireless links, such as cellular links, satellite links, Wi-Fi links and/or the like.

The provider network 2 may comprise a message service 5. The message service 5 may be configured to receive a plurality of messages. The plurality of messages may comprise a plurality of comments associated with content and information related to the plurality of comments. The plurality of messages may be associated with a particular content item, content session, and/or the like.

The message service 5 may be configured to manage messages for various content items. Users may browse content and access different content items to view comments for particular content, such as comments posted by other users for that particular content. Comments from users associated with a particular content item may be output to other users watching the particular content item. For example, all users accessing a content item (e.g., video clip) may view comments associated with the content item. Comments that are input may be output in real-time or near-real-time.

The message service 5 may be configured to process the plurality of messages. The message service 5 may implement a queue or otherwise prioritize processing of the plurality messages based on information, e.g., time stamps, incremented identifier, associated with corresponding comments. The message service 5 may be configured to process the plurality of messages using load balancing. For example, the message service 5 may be configured to use one or more of the plurality of processing nodes to process the messages, prioritize the messages, load balance the messages, and/or the like. The message service 5 may store, at least temporarily, the plurality of messages. The message service 5 may store the messages in a datastore, such as a database.

The message service 5 may be configured to process a message by performing a grouping process. The grouping process may comprise grouping messages based on a characteristic. If two messages have the same characteristic or are within a threshold range of a characteristic, then the messages may be grouped. Messages associated with a particular content item (e.g., stream, file, show, movie, song, game session) may be associated with the same group. For example, a message may comprise or be associated with a content identifier. The content identifier may uniquely identify the content item. The message service 5 may associate a message with a group associated with the content item if the content identifier is found in the message or otherwise associated with the message (e.g., sent separately).

The message service 5 may perform natural language processing, topic recognition, pattern recognition, artificial intelligence, and/or the like to automatically determine characteristics of the messages and/or group the messages. As an example, frequently occurring phrases or patterns may be identified as topics. As another example, a database of topics associated with content may be maintained. The topics may include genres (e.g., action, drama, comedy), personalities (e.g., actors, actresses, directors), languages, and/or the like. Messages may be grouped based on characteristics of the client device and/or users sending the messages. Demographics, interests, history, and/or like may be stored for a plurality of users to determine potential groupings of messages.

The message service 5 may be configured to process messages by determining contexts for outputting (e.g., displaying, presenting) comments comprised in the messages. The context may comprise a context for outputting a comment based on the grouping. The context may comprise a time context associated with a time to output the comment.

A message may indicate a time when a comment was input by a user. The time may comprise a time internal to the content item or other similar information, such as fragment identifiers. For example, the time may indicate a portion of the content item (e.g., one or more content fragments) that was viewed by a user when the user input a comment. The time may indicate when a user started inputting the comment, a duration of inputting, a time when the input was submitted, and/or the like.

The message service 5 may determine to output a comment during or close to the portion of content item being commented. In an example, if multiple messages are received for a portion of time (e.g., a scene), then a time offset may be added to some of the messages to prevent all of corresponding comments from being output at the same time.

The context may further comprise a graphical context associated with a form of the comment. The graphical context may comprise a size, a color, a font, and/or the like. The context may comprise a moving context in which the comment moves when output. The moving context may comprise an animation. For example, the moving context may comprise a direction of movement (e.g., left to right, right to left, up to down, down to up, diagonally). The moving context may comprise any type of animation, such as a spinning motion, a waving motion, a zig-zag, a circular motion, increasing in size, decreasing in size, and/or the like.

The context may be determined based on a preference associated with a message. For example, a user may specify a preference for how a corresponding comment is to be output. The user may specify the context for a particular comment. The context may be determined based on a characteristic of a particular content item. For example, the graphical context may be determined based on the background color of the content item during a particular segment. The graphical context may contrast with the background color of the content item.

The message service 5 may be further configured to process a message by generating output data. The output data may comprise instructions for implementing outputting a comment based on corresponding context. The output data may comprise application data for instructing an application to overlay the comment based on the context. The output data may comprise instructions for generating (e.g., encoding) content corresponding to a comment.

The output data may be used to generate (e.g., encode) output commentary content, such as an output content stream. The output commentary content may be combined (e.g., multiplexed) with original content item such as the content provided by the content service 3. The resulting combination may comprise content in a single package (e.g., container, transport container, transport stream). The package may comprise the original content item along with the output commentary content (e.g., displayed on top of the original content item).

The message service 5 may be further configured to process messages by performing a screening process. The screening process may comprise rejecting or flagging messages that match screening criteria. The screening criteria may specify terms and/or phrases, such as profanity, hate speech, indecent language, and/or the like. The screening criteria may specify characters, such as symbols, fonts, and/or the like. The screening criteria may specify languages, computer readable code patterns, and/or the like.

The provider network 2 may further comprise a processing service 6. The processing service 6 may be configured to provide processing for a variety of services, such as the services of the provider network 2. The processing service 6 may comprise a plurality of processing nodes 8 (e.g., as a service). The plurality of processing nodes 8 may process tasks associated with a message service 5. The plurality of processing nodes 8 may be implemented as one or more computing devices, one or more processors, one or more virtual computing instances, a combination thereof, and/or the like.

The plurality of processing nodes 8 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The plurality of processing nodes 8 may comprise nodes associated with providing specific services (e.g., processing tasks). The nodes may be dedicated to providing these specific services. For example, the plurality of processing nodes 8 may implement a receiver, a content generator, a combiner, a transcoder, a combination thereof.

In some embodiments, the plurality of processing nodes 8 may process events submitted by the plurality of client computing devices. The events may be associated with discussing real-time news, videos, social hot topics, reports against certain user accounts, and/or the like. In other embodiments, the plurality of processing nodes 8 may process performance evaluation for a plurality of user account who review events in the network community. In some implementations, these services may be implemented as dedicated computing devices, dedicated processors, dedicated virtual machine instances, and/or the like. In other implementations, a variety of different nodes may implement any of the functions associated with these services.

The plurality of client devices 10 may be configured to access the content and the services of the provider network 2. The plurality of client devices 10 may comprise any type of computing device, such as a mobile device, a tablet device, laptop, a computing station, a smart device (e.g., smart apparel, smart watch, smart speaker, smart glasses), a virtual reality headset, a gaming device, a set top box, digital streaming device, robot, a vehicle terminal, a smart TV, a TV box, an e-book reader, MP3 (Moving Picture Experts Group Audio Layer III) players, MP4 (Moving Picture Experts Group Audio Layer IV) players, and so on.

The plurality of client devices 10 may be associated with one or more users. A single user may use one or more of the plurality of client devices 10 to access the provider network 2. The plurality of client devices 10 may travel to a variety of locations and use different networks to access the provider network 2.

An example client device 10 may comprise an application 12. The application 12 outputs (e.g., display, render, present) content to a user. The content may comprise videos, audio, comments, textual data and/or the like. The application 12 may also provide a menu for navigating a variety of content.

The client device 10 may access an interface 16 that allows users to provide comments associated with corresponding content and submit events to a processing service. The interface 16 may comprise an input element. For example, the input element may be configured to receive input from a user, such as comments associated with a particular content, events, user accounts, and/or the like. In some embodiments, the interface 16 may be implemented as part of the application 12.

The application 12 may allow a user to set a context (e.g., color, font size, animation, emoji, scrolling direction) associated with his or her input. The application 132 may determine (e.g., automatically) other context information, such as timing information (e.g., start time, duration, end time for the input). The application 12 may send the input, the context, the context information, and/or other information to the message service 5 of the provider network 2.

Figure 2:
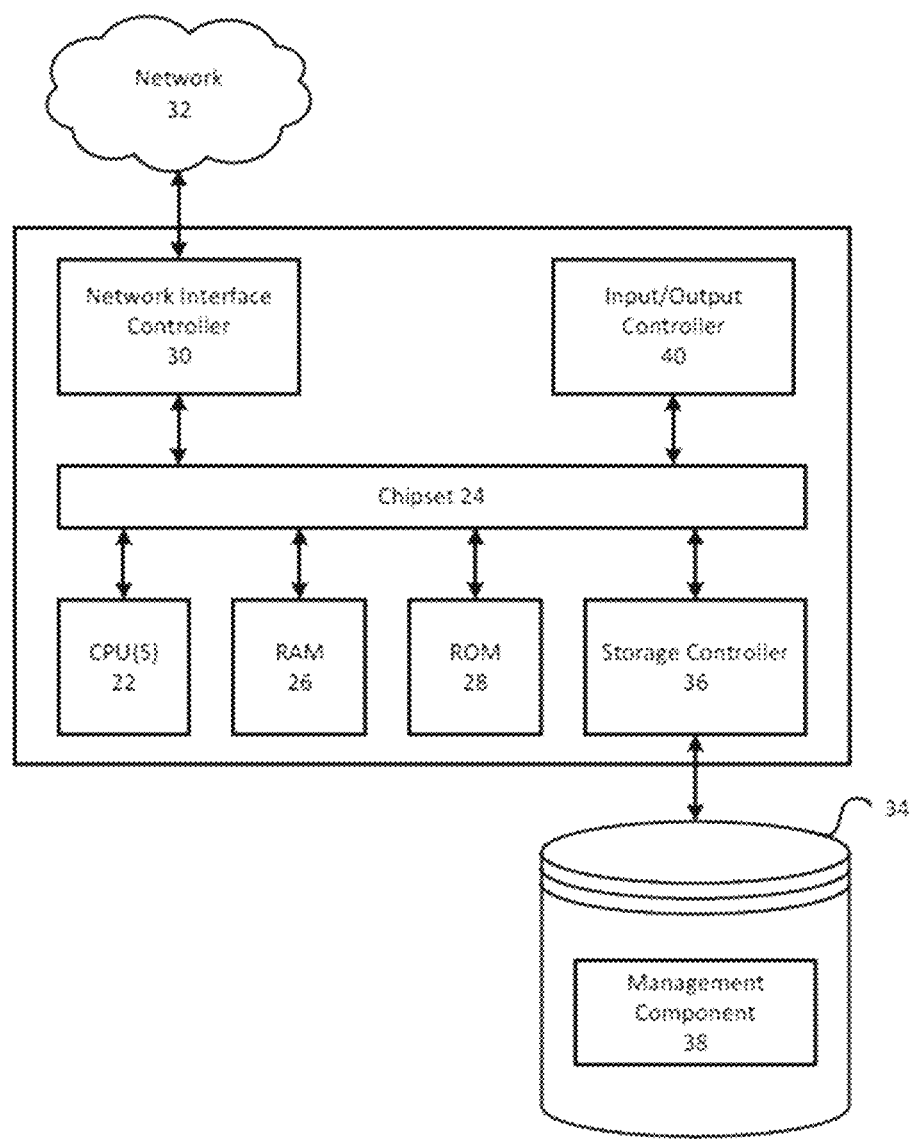
FIG. 2 is a schematic diagram illustrating an example computing device that may be used in accordance with the present disclosure.

FIG. 2 depicts a computing device that may be used in various aspects, such as services, networks, and/or clients. The computer architecture shown in FIG. 2 shows a conventional server computer, workstation, desktop computer, laptop, tablet, network appliance, PDA, e-reader, digital cellular phone, or other computing nodes, and may be utilized to execute any aspects of the computers described herein, such as to implement the methods described herein.

A computing device 20 may include a baseboard, or "motherboard," which is a printed circuit board to which a multitude of components or devices may be connected by way of a system bus or other electrical communication paths. One or more central processing units (CPUs) 22 may operate in conjunction with a chipset 24. The CPU(s) 22 may be standard programmable processors that perform arithmetic and logical operations necessary for the operation of the computing device 20.

The CPU(s) 22 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 22 may be augmented with or replaced by other processing units, such as GPU(s). The GPU(s) may comprise processing units specialized for but not necessarily limited to highly parallel computations, such as graphics and other visualization-related processing.

A chipset 24 may provide an interface between the CPU(s) 22 and the remainder of the components and devices on the baseboard. The chipset 24 may provide an interface to a random access memory (RAM) 26 used as the main memory in the computing device 20. The chipset 24 may further provide an interface to a computer-readable storage medium, such as a read-only memory (ROM) 28 or non-volatile RAM (NVRAM) (not shown), for storing basic routines that may help to start up the computing device 20 and to transfer information between the various components and devices. ROM 28 or NVRAM may also store other software components necessary for the operation of the computing device 20 in accordance with the aspects described herein.

The computing device 20 may operate in a networked environment using logical connections to remote computing nodes and computer systems through a local area network (LAN). The chipset 24 may include functionality for providing network connectivity through a network interface controller (NIC) 30, such as a gigabit Ethernet adapter. A NIC 30 may be capable of connecting the computing device 20 to other computing nodes over a network 32. It should be appreciated that multiple NICs 30 may be present in the computing device 20, connecting the computing device to other types of networks and remote computer systems.

The computing device 20 may be connected to a mass storage device 34 that provides non-volatile storage for the computer. The mass storage device 34 may store system programs, application programs, other program modules, and data, which have been described in greater detail herein. The mass storage device 34 may be connected to the computing device 20 through a storage controller 36 connected to the chipset 24. The mass storage device 34 may consist of one or more physical storage units. The mass storage device 34 may comprise a management component 38. A storage controller 36 may interface with the physical storage units through a serial attached SCSI (SAS) interface, a serial advanced technology attachment (SATA) interface, a fiber channel (FC) interface, or other types of interface for physically connecting and transferring data between computers and physical storage units.

The computing device 20 may store data on the mass storage device 34 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 34 is characterized as primary or secondary storage and the like.

For example, the computing device 20 may store information to the mass storage device 34 by issuing instructions through a storage controller 36 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 20 may further read information from the mass storage device 34 by detecting the physical states or characteristics of one or more particular locations within the physical storage units.

In addition to the mass storage device 34 described above, the computing device 20 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 20.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 34 depicted in FIG. 2, may store an operating system utilized to control the operation of the computing device 20. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 34 may store other system or application programs and data utilized by the computing device 20.

The mass storage device 34 or other computer-readable storage media may also be encoded with computer-executable instructions, which, when loaded into the computing device 20, transforms the computing device from a general-purpose computing system into a special-purpose computer capable of implementing the aspects described herein. These computer-executable instructions transform the computing device 20 by specifying how the CPU(s) 22 transition between states, as described above. The computing device 20 may have access to computer-readable storage media storing computer-executable instructions, which, when executed by the computing device 20, may perform the methods described herein.

A computing device, such as the computing device 20 depicted in FIG. 2, may also include an input/output controller 40 for receiving and processing input from a number of input devices, such as a keyboard, a mouse, a touchpad, a touch screen, an electronic stylus, or another type of input device. Similarly, an input/output controller 40 may provide output to a display, such as a computer monitor, a flat-panel display, a digital projector, a printer, a plotter, or another type of output device. It will be appreciated that the computing device 20 may not include all of the components shown in FIG. 2, may include other components that are not explicitly shown in FIG. 2, or may utilize an architecture completely different than that shown in FIG. 2.

As described herein, a computing device may be a physical computing device, such as the computing device 20 of FIG. 2. A computing node may also include a virtual machine host process and one or more virtual machine instances. Computer-executable instructions may be executed by the physical hardware of a computing device indirectly through interpretation and/or execution of instructions stored and executed in the context of a virtual machine.

The comment in the embodiment of the present disclosure can be presented in large video playing devices, game consoles, desktop computers, smart phones, tablets, MP3 (Moving Picture Experts Group Audio Layer III, moving picture expert compression standard audio layer) players, MP4 (Moving Picture Experts Group Audio Layer IV, moving picture expert Compression standard audio level) players, laptops, e-book readers, and other display terminals.

The comment in the embodiment of the present disclosure can be applied not only to a video program in type of a game, but also to any application scenario in which the comment can be displayed. For example, the comment can be applied to some job-seeking programs, to some blind-dating programs, to multi-party confrontation entertainment programs and so on. In the embodiment of the present disclosure, a comment is applied to a football live video broadcast program as an example, but not limited thereto.

Figure 3:
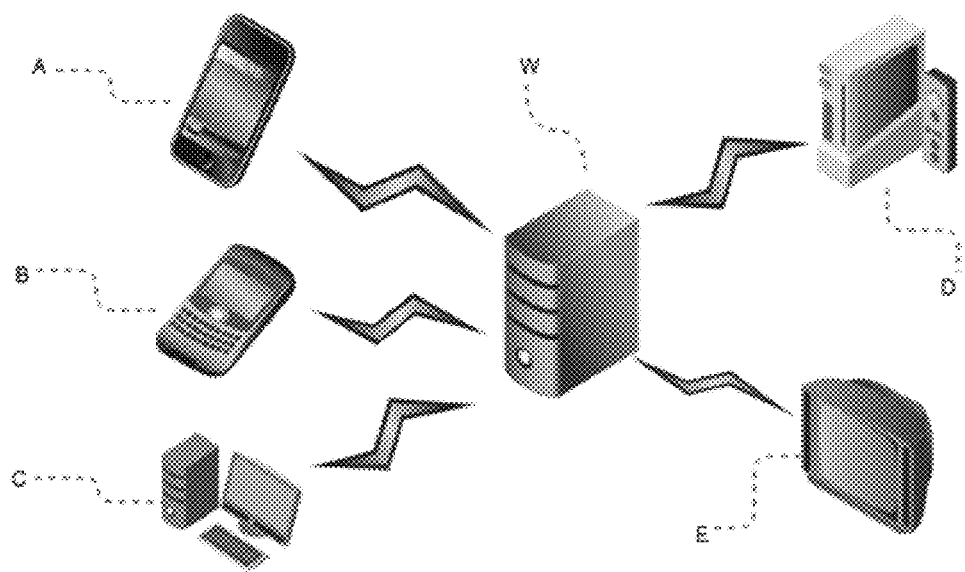
FIG. 3 is a framework diagram illustrating an example system architecture diagram for sending comment information according to an embodiment of the disclosure.

In the embodiment, after voice comment information sent by a user through a client is processed by a server, the voice comment information can be sent to every client via the server, and the voice comment information is displayed on each client. Referring to FIG. 3, FIG. 3 is a framework diagram illustrating an example system architecture diagram for sending comment information according to an embodiment of the disclosure. As shown in FIG. 3, user A, user B, and user C separately transmit voice comment information to server W through a wireless network, and user D and user E transmit voice comment information to server W through a wired network. Wherein, the user A, user B, user C, user D, and user E are watching a live match between team A and team B in a football match. In the embodiment, only server W is given here. The application scenario here may also include multiple servers communicating with each other. The server W may be a cloud server or a local server. In the embodiment of the present disclosure, the server W is placed on the cloud side. If voice comment information is sent by the user A, the server W processes the voice comment information and forwards the voice comment information to the user A, user B, user C, user D, and user E.

Figure 4:
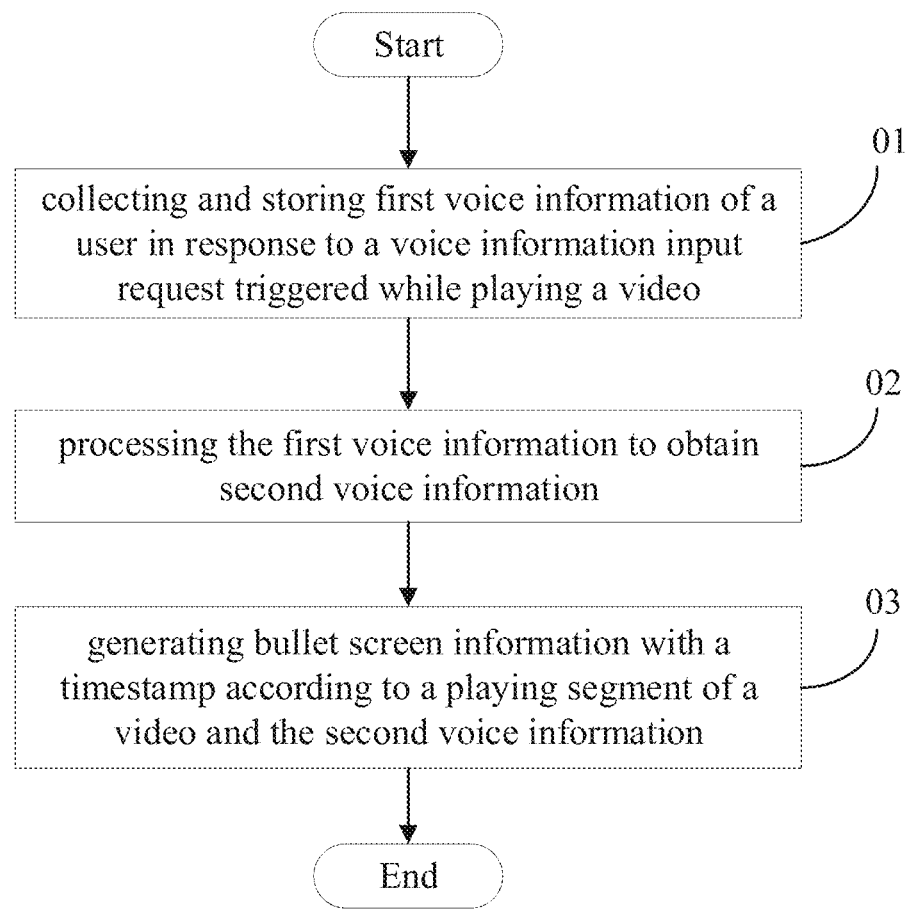
FIG. 4 is a flowchart illustrating an example method for processing comment information according to an embodiment of the disclosure.
Figure 5:
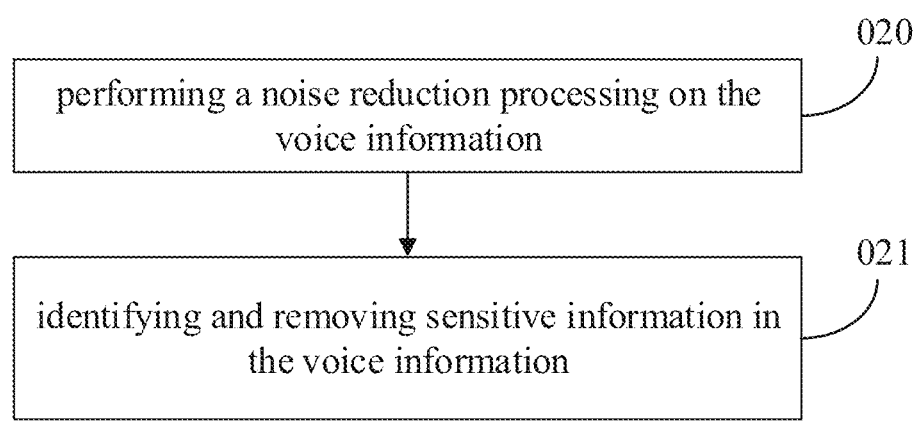
FIG. 5 is a flowchart illustrating an example block 02 in FIG. 4 according to an embodiment of the disclosure.

A method for processing comment information is provided. Referring to FIG. 4, FIG. 4 is a schematic flowchart illustrating an example method for processing comment information according to an embodiment of the present disclosure. As can be seen from the figure, the method for processing comment information provided in the embodiment mainly includes the following blocks:

At block 01, collecting and storing first voice information of a user, in respond to a voice information input request triggered while playing a video.

In an actual application, while watching the video, the user can send the voice input request to a client computing device by triggering a button of the voice input request. For example, a voice input button can be provided on the comment input box of a user interface of the client computing device. The voice input request can be input by the user by triggering the voice input button.

In the embodiment of the present disclosure, in order to reduce interference of sound of a playing video on the first voice information during the video playback process, the first voice information is collected after the voice input request is received and playing volume of the playing video can be adjusted to a preset volume by the client. At the same time, to ensure playback effect of current playing video, the sound of the current playing video is restored after the voice input is completed. Therefore, problem of affecting sound quality of the first voice information due to mutual interference between a video output audio and the voice input by the user can be avoided.

It should be noted that the preset volume can be 0, that is, the sound of the current playing video is turned off, or the sound of the current playing video is buffered. In one exemplary embodiment, the sound of the current playing video can be turned down to a volume threshold.

By way of example but not limitation, when the first voice information of user's evaluations of a video content is collected by the client, the client determines whether to buffer the sound of the current playing video according to the voice input request. In response to a determination to buffer the sound of the current playing video, buffering the sound of the current playing video when voice input of the client is started, and turning down the sound of the current playing video within a preset time. After the voice input is completed, the sound of the current playing video is restored. Wherein, whether to start voice input can be determined according to whether a voice input request is received by the client, and the voice input is started while the client receives a voice input request. Whether the voice input is completed can also be determined by whether a voice button is received. For example, after the voice input is completed, the user releases a recording button, which determines that the voice input of the client is completed and a subsequently corresponding operation can be performed.

At block 02, processing the first voice information to obtain second voice information.

At block 03, generating bullet screen information with a timestamp according to a playing segment of a video and the second voice information.

The comment information comprises voice comment information and/or text comment information.

After the first voice information is sent by the user, obtaining the timestamp of the segment of the video commented by the voice information. It should be noted that the timestamp involved in this embodiment refers to time point of each video segment in the playing video, and the timestamp records video contents commented by the user. As users send the first voice information in different ways, an implementation of obtaining the timestamp is different.

In the embodiment of the present disclosure, the voice information is input by the user, and the voice comment or the text comment is generated based on the voice information, thereby convenience of inputting or receiving the comment is improved.

In the embodiment, the comment information can be the voice comment information or the text comment information, or the comment information can be the voice comment information and the text comment information. The user may choose to generate the text comment information, or the voice comment information, or both the text comment information and the voice comment information on the client. After form of the comment information is chosen, sending the comment information to the server, and then the comment information is sent to other clients by the server.

In the embodiment, as illustrated in FIG. 4, when the comment information is the voice comment information, the processing the first voice information to obtain a second voice information includes a block 020 and a block 021:

at block 020, performing a noise reduction processing on the voice information; and at block 021, identifying and removing sensitive information in the voice information.

In an embodiment, when the comment information is the voice comment information, the generating bullet screen information with a timestamp according to a playing segment of a video and the second voice information includes generating the voice comment information marked with the timestamp based on the playing segment of the video and the second voice information.

The sensitive information refers to sensitive words. The sensitive words generally refer to words with sensitive political tendencies (or anti-ruling party tendencies), violent tendencies, unhealthy colors or uncivilized words.

By way of example but not limitation, a sensitive word database is provided. A sensitive word is obtained by matching the first voice information with the sensitive words in the sensitive word database. Then, the sensitive word is identified and removed from the first voice information to obtain the second voice information. The comment information with a timestamp is generated according to the playing segment of the video and the second voice information.

In the embodiment of the present disclosure, according to the comment information processing method, during the video playback process, the first voice information of the video contents commented by the user is collected and processed, so as to identify and remove the sensitive word from the first voice information to generate the comment information. It is effective and real-time to recognize and filter the sensitive word in the first voice information input by the user and an assurance for a healthy environment of the network is provided.

In the embodiment of the present disclosure, considering that the voice information is easy to be mixed into a background sound of the video or other external sounds when input by the user, a noise reduction processing is performed on the first voice information in order to improve quality of the voice comment information.

In an embodiment of the present disclosure, after the generating the voice comment information marked with the timestamp based on the playing segment of the video and the second voice information, the method further includes performing a high-fidelity compression on the voice comment information.

In the embodiment of the present disclosure, the voice comment information is compressed for easy transmission. A corresponding frequency is selected according to frequency band in which the user speaks, for a high-quality compression. Frequency bands besides the corresponding frequency are normally compressed, for ensuring quality of the audio information after the audio information is compressed. It reduces distortion rate of the audio information.

Figure 6:
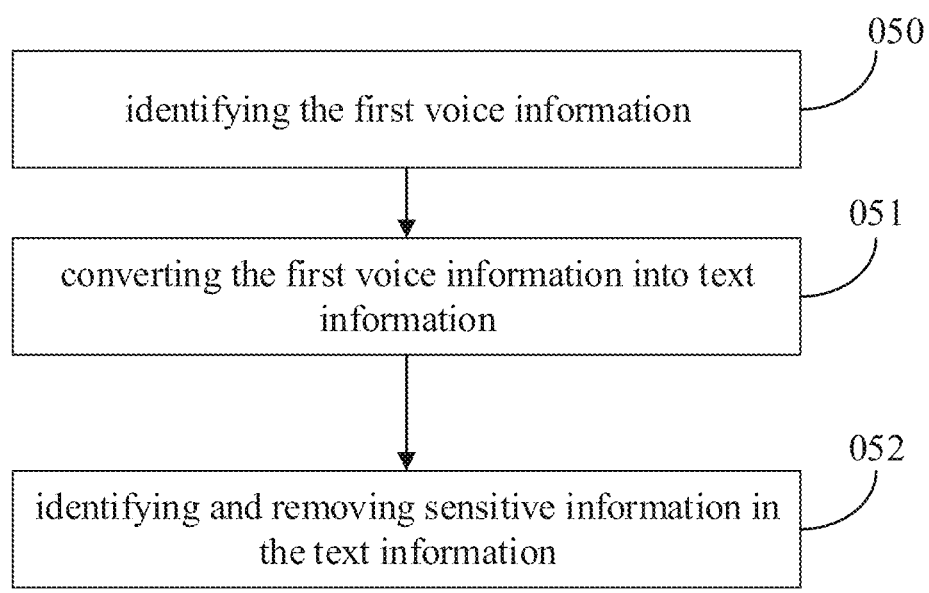
FIG. 6 is a flowchart illustrating another example block 02 in FIG. 4 according to an embodiment of the disclosure.

In one exemplary embodiment, as illustrated in FIG. 6, when the comment information is the text comment information, the processing the first voice information to obtain a second voice information comprises the following blocks:

At block 050, identifying the first voice information.

At block 051, converting the first voice information into text information.

At block 052, identifying and removing sensitive information in the text information.

In one exemplary embodiment, when the comment information is the text comment information, the generating bullet screen information with a timestamp according to a playing segment of a video and the second voice information comprises generating the text comment information marked with the timestamp according to the playing segment of the video.

In one exemplary embodiment, after the converting the voice information into text information, the method further comprises adjusting the text information according to a text context based on network terms.

Wherein, the network terms are mostly informal languages popular on the Internet. Most of the network terms are homophones, typos, pictographs, second-order languages, or classic quotes causing popularity on forums and so on.

In the embodiment of the present disclosure, the first voice information is recognized and converted to the text information, and the text information is displayed to the user. The text information is adaptively adjusted through network terms according to the context of the text, so as to achieve a more vivid expression of the content of comment.

In another embodiment, before the generating the text comment information marked with the timestamp according to the playing segment of the video, the method further comprises providing a text box displaying the text information for a user to modify the text information. The text information can be added, deleted, and modified by the user.

In the embodiment of the present disclosure, the comment information includes a client identifier that sends the comment and/or a user identification identifier to identify source of the comment information. The user identification identifier can be associated with a specific voice input user through the client identifier.

Figure 7:
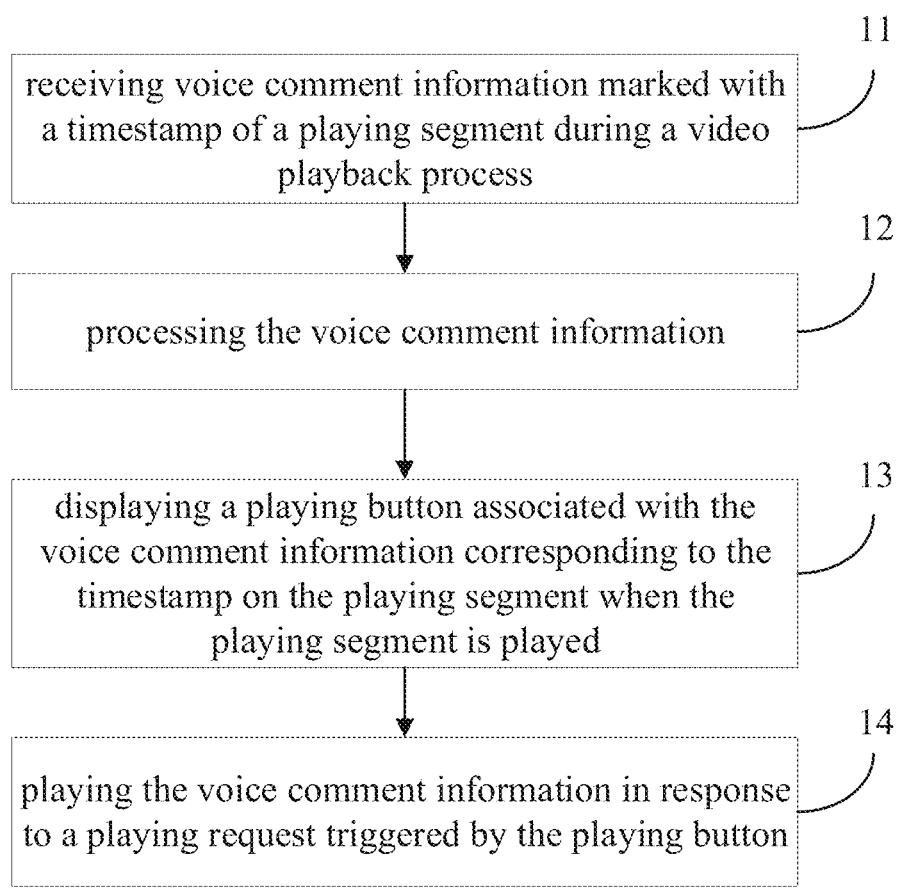
FIG. 7 is a flowchart illustrating another example method for processing comment information according to an embodiment of the disclosure.

Referring to FIG. 7, FIG. 7 is a schematic flowchart of a method for processing comment information according to another embodiment of the present disclosure. The method for processing comment information provided in the embodiment comprises the following blocks:

At block 11, receiving voice comment information marked with a timestamp of a playing segment during a video playback process.

In the embodiment, the first voice comment information sent by the server can be generated by the client according to a voice input instruction during the video playback process. The first voice comment information includes the client identifier and/or a voice input user identification to identify source of the first voice comment. Of course, the first voice comment can also be generated directly on the server side. For example, the server stores a voice comment library. The first voice comment is generated by the server according to the voice input instruction. For example, voice of a famous football commentator can be collected by voice input instructions, and the first voice comment is directly generated according to the voice. The first voice comment is sent by the server to each client during a football match. In this case, the voice input user identification is directly synthesized in the first voice comment by the server, wherein the voice input user identification can be a name of the famous football commentator.

at block 12, processing the voice comment information.

In one exemplary embodiment, the processing the first voice comment information to obtain second voice comment information comprises identifying and removing sensitive information in the voice comment information.

A sensitive word database is provided. The sensitive word is obtained by matching the voice information with the sensitive word in the sensitive word database, and the sensitive word is identified and removed, ensuring the healthy environment of the network.

At block 13, displaying the voice comment information corresponding to the timestamp on the playing segment when the playing segment is played and a playing button corresponding to the voice comment information.

At block 14, playing the voice comment information in response to a playing request triggered by the playing button.

In one exemplary embodiment, the playing the voice comment information comprises playing the voice comment information after adjusting playing volume of the playing video to a preset volume.

In the embodiment of the present disclosure, in order to reduce interference of sound of a playing video on the second voice comment information during the video playback process, playing volume of the video can be adjusted to a preset volume and the second voice comment information is played after a playing instruction is received. At the same time, to ensure playback effect of current video, the sound of the current playing video is restored after the voice input is completed. In addition, in order to further reduce the interference of the sound of the current playing video to the playing of the second voice comment information, the client further collects current background sounds or ambient noises, and plays the voice comment information when the background sounds or ambient noises are small. Therefore, problem of affecting audio quality of the voice information due to the interference between the audio output by the video and the voice comment information is avoided.

It should be noted that the preset volume can be 0, that is, sound of the current playing video is turned off or the sound of the current playing video is buffered. In one exemplary embodiment, the sound of the current playing video can be turned down to a volume threshold.

In one exemplary embodiment, the playing the voice comment information comprises playing the comment information according to the preset volume and/or a preset tone.

The volume of the second voice comment information can be adjusted, and different tones (such as female voices, male voices, animated character sounds and so on) can be set to play the second voice comment information according to user's preferences.

In the embodiment of the present disclosure, when the user receives the second voice comment information, a duration information display is configured on the second voice comment information in order to help the user to understand duration of the voice comment information. For example, the duration information of the voice comment information is displayed behind the voice comment information, so that whether to play the voice comment is determined by a playing client according to the duration information. In addition, when the comment in voice form is related to contents played by the video, the timestamp of the contents played by the current video is added in addition to the duration of the voice comment itself.

Figure 8:
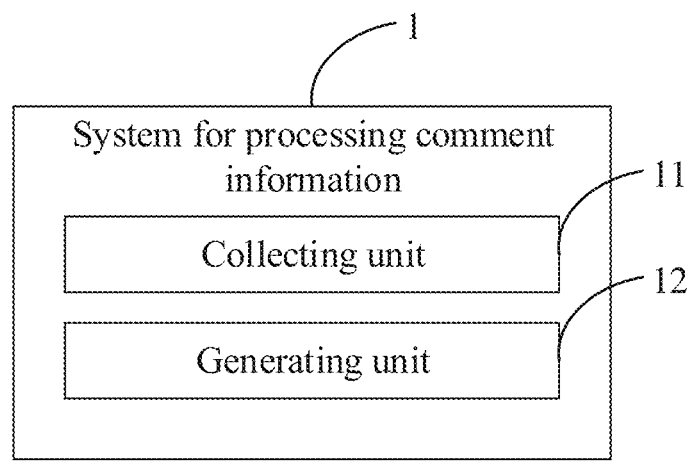
FIG. 8 is a block diagram of program modules of a system for processing comment information according to an embodiment of the disclosure.

FIG. 8 is a block diagram of program modules of a system for processing comment information according to an embodiment of the disclosure. As shown in FIG. 8, a system 1 for processing comment information comprises: a collecting unit 11 and a generating unit 12.

The collecting unit 11 is configured to collect and store first voice information of a user in respond to a voice information input request triggered during a video playback process.

Figure 9:
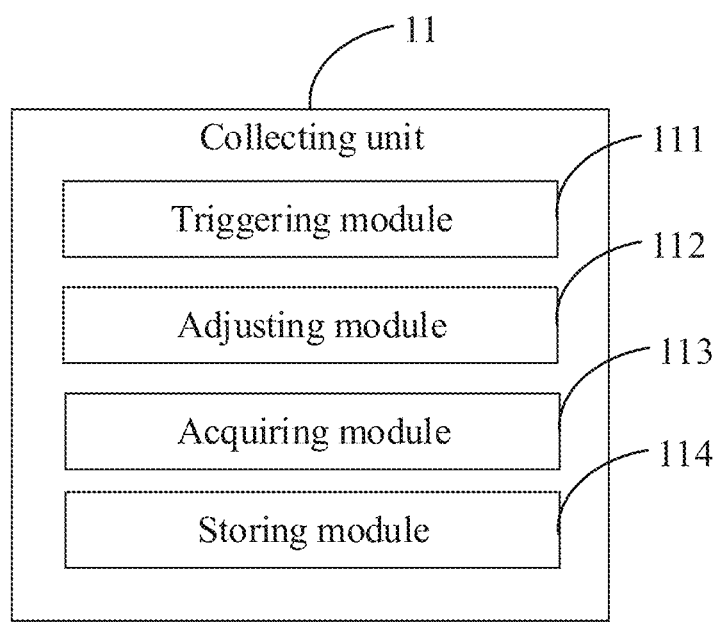
FIG. 9 is a block diagram of a collecting unit according to an embodiment of the disclosure.

Furthermore, as illustrated in FIG. 9, the collecting unit 11 comprises: a triggering module 111, a adjusting module 112, an acquiring module 113 and a storing module 114.

The triggering module 111 is configured to receive the voice information input request input by the user.

The adjusting module 112 is configured to adjust volume of the video to a preset volume.

The acquiring module 113 is configured to collect the first voice information of the user.

The storing module 114 is configured to store the first voice information.

The generating unit 12 is configured to process the voice information, and generate comment information with a timestamp according to a playing segment of the video and the second voice information.

Figure 10:
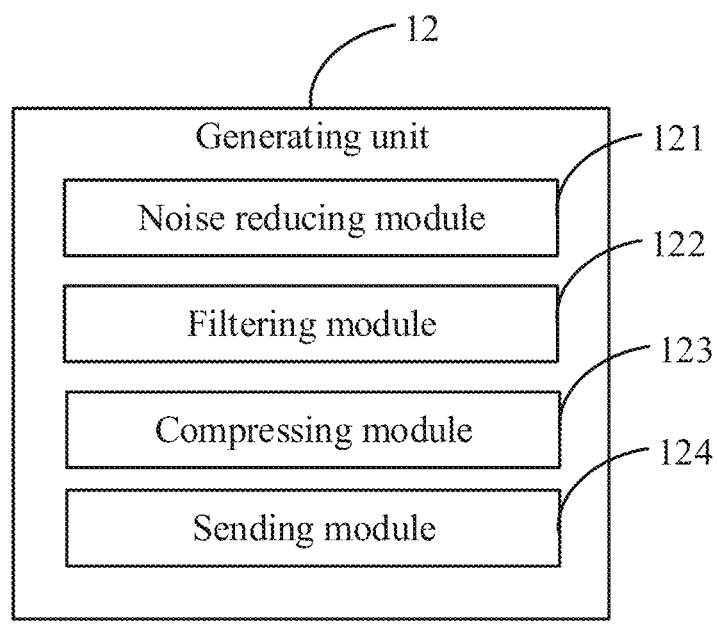
FIG. 10 is a block diagram of a generating unit according to an embodiment of the disclosure.

Furthermore, as illustrated in FIG. 10, the generating unit 12 comprises a noise reducing module 121, a filtering module 122, a compressing module 123 and a sending module 124.

The noise reducing module 121 is configured to perform noise reduction processing on the first voice information.

The filtering module 122 is configured to identify and remove sensitive information in the first voice information to obtain the second voice information.

The compressing module 123 is configured to perform a high-fidelity compression on the voice comment information after the second voice information is performed noise reduction processing, and sensitive information in the second voice information is identified and removed.

The sending module 124 is configured to send the voice comment after compressed to the server.

In the embodiment of the present disclosure, first voice information can be input for users, voice comment can be generated or the voice information can be recognized to the text comment. Convenience of inputting or receiving comment is improved. The system for processing comment information may be formed on the client, and the client processes the voice comment information sent by the server during the video playback process to identify and remove the sensitive information in the voice comment information, thereby effectively identifying and removing sensitive words in voice information input by users in real time, thus a guarantee for the healthy environment of the network is provided.

Figure 11:
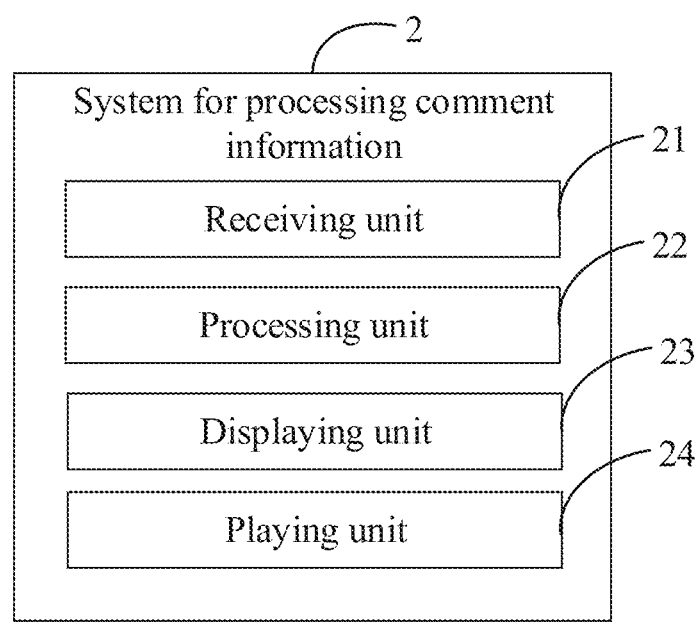
FIG. 11 is a block diagram of another system for processing comment information according to another embodiment of the disclosure.

FIG. 11 is a block diagram of system 2 for processing comment information according to another embodiment of the disclosure. As shown in FIG. 11, the system 2 for processing comment information comprises: a receiving unit 21, and a processing unit 22, and a displaying unit 23 and a playing unit 24.

The receiving unit 21 is configured to receive first voice comment information marked with a timestamp of a playing segment during a video playback process.

The processing unit 22 is configured to process the voice comment information.

Specifically, the processing unit 22 is configured to identify and remove sensitive information in the first voice comment information to obtain the second voice comment information.

The displaying unit 23 is configured to display the second voice comment information correspoding to the timestamp on the playing segment when the playing segment is played and a playing button.

The playing unit 24 is configured to play the second voice comment information in response to a playing request triggered by the playing button.

In the embodiment of the present disclosure, the comment information processing system may be formed on the client. The voice comment information sent by the server is processed by the client during the video playing process to identify and remove the sensitive information in the first voice comment information, thereby effectively identifying and removing sensitive words in the first voice information input by users in real time, providing a guarantee for the healthy environment of the network, and outputting processed voice comment information.

In practical applications, in order to reduce interference of sound of a playing video on the second voice comment information during the video playback process, playing volume of the video can be adjusted to a preset volume, and the second voice comment information is played after a playing instruction is received. At the same time, to ensure playback effect of current video, the sound of the current playing video is restored after the voice input is completed. In addition, in order to further reduce the interference of the sound of the current playing video to the playing of the second voice comment information, the client further collects current background sounds or ambient noises, and plays the voice comment information when the background sounds or ambient noises are small. Therefore, problem of affecting audio quality of the voice information due to the interference between the audio output by the video and the voice comment information is avoided.

What is claimed is:

1. A computer-implemented method for processing comment information, comprising:
   collecting first voice information from a user in response to receiving a request for inputting voice information while the user is watching a video, wherein the video comprises a plurality of segments, and the first voice information is associated with a segment among the plurality of segments;
   obtaining a timestamp corresponding to the segment among the plurality of segments;
   processing the first voice information and obtaining second voice information;
   generating bullet screen information based at least in part on the timestamp and the second voice information, wherein a bullet screen corresponding to the generated bullet screen information is to be presented relative to the video;
   wherein the computer-implemented method further comprises:
   receiving the bullet screen information;
   generating an interface associated with the bullet screen information;

presenting the interface at a time corresponding to the segment of the video based on the timestamp; and playing the bullet screen information in response to receiving a request via the interface.

2. The computer-implemented method of claim 1, wherein the first voice information is collected after a sound volume of the video is adjusted to a predetermined value.

3. The computer-implemented method of claim 1, further comprising:

performing a noise reduction processing on the first voice information; and identifying and removing sensitive information from the first voice information.

4. The computer-implemented method of claim 1, further comprising:

performing a high-fidelity compression on the first voice information.

5. The computer-implemented method of claim 1, further comprising:

converting the first voice information into text comment information; and identifying and removing sensitive information from the text comment information.

6. The computer-implemented method of claim 5, further comprising:

generating and presenting another interface comprising the text comment information, the text comment information is to be edited by the user via the another interface.

7. The computer-implemented method of claim 6, further comprising:

modifying the text comment information using network terms based on a context of the text comment information.

8. The computer-implemented method of claim 1, wherein the bullet screen information comprises at least one of the text comment information or voice comment information.

9. The computer-implemented method of claim 8, further comprising:

playing the voice comment information after a sound volume of the video is adjusted to a predetermined value.

10. The computer-implemented method of claim 9, further comprising:

playing the voice comment information according to at least one of a predetermined volume or a predetermined tone.

11. A computing system of processing comment information, comprising:

at least one processor; and at least one memory communicatively coupled to the at least one processor to configure the at least one processor to:

collect first voice information from a user in response to receiving a request for inputting voice information while the user is watching a video, wherein the video comprises a plurality of segments, and the first voice information is associated with a segment among the plurality of segments;

obtain a timestamp corresponding to the segment among the plurality of segments;

process the first voice information and obtain second voice information;

generate bullet screen information based at least in part on the timestamp and the second voice information, wherein a bullet screen corresponding to the generated bullet screen information is to be presented relative to the video;

wherein the at least one memory further configures the at least one processor to:

receive the bullet screen information;

generate an interface associated with the bullet screen information;

present the interface at a time corresponding to the segment of the video based on the timestamp; and play the bullet screen information in response to receiving a request via the interface.

12. The computing system of claim 11, the at least one memory further configuring the at least one processor to:

perform a noise reduction processing on the first voice information; and identify and remove sensitive information from the first voice information.

13. The computing system of claim 11, the at least one memory further configuring the at least one processor to:

convert the first voice information into text comment information; and identify and remove sensitive information from the text comment information.

14. The computing system of claim 13, the at least one memory further configuring the at least one processor to:

modify the text comment information using network terms based on a context of the text comment information.

15. The computing system of claim 13, wherein the bullet screen information comprises at least one of the text comment information or voice comment information.

16. A non-transitory storage medium, storing computer-readable instructions that upon execution on a computing device cause the computing device at least to:

collect first voice information from a user in response to receiving a request for inputting voice information while the user is watching a video, wherein the video comprises a plurality of segments, and the first voice information is associated with a segment among the plurality of segments;

obtain a timestamp corresponding to the segment among the plurality of segments;

process the first voice information and obtain second voice information;

generate bullet screen information based at least in part on the timestamp and the second voice information, wherein a bullet screen corresponding to the generated bullet screen information is to be presented relative to the video;

wherein the non-transitory storage medium further stores computer-readable instructions that upon execution on the computing device cause the computing device at least to:

receive the bullet screen information;

generate an interface associated with the bullet screen information;

present the interface at a time corresponding to the segment of the video based on the timestamp; and play the bullet screen information in response to receiving a request via the interface.

17. The non-transitory storage medium of claim 16, further storing computer-readable instructions that upon execution on the computing device cause the computing device at least to:

perform a noise reduction processing on the first voice information;

identify and removing sensitive information from the first voice information.

\* \* \* \* \*